United States Patent [19]

Schlatter et al.

[11] Patent Number: 4,530,227
[45] Date of Patent: Jul. 23, 1985

[54] HYDROSTATIC SUPPORT MEMBER, PARTICULARLY FOR ROLLING MILLS, AND METHOD OF USING THE SAME

[75] Inventors: Beat Schlatter, Mutschellen; Eugen Schnyder, Ottenbach, both of Switzerland

[73] Assignee: Sulzer-Escher Wyss Limited, Zurich, Switzerland

[21] Appl. No.: 514,978

[22] Filed: Jul. 18, 1983

[30] Foreign Application Priority Data

Jul. 30, 1982 [CH] Switzerland .......................... 4619/82

[51] Int. Cl.³ .............................................. B21B 13/14
[52] U.S. Cl. ........................................ 72/241; 72/245; 384/99; 384/116; 384/117
[58] Field of Search ............................ 72/241, 243, 245; 384/99, 117, 116

[56] References Cited

U.S. PATENT DOCUMENTS

| | | | |
|---|---|---|---|
| 4,041,752 | 8/1977 | Dolenc et al. | 72/241 |
| 4,136,546 | 1/1979 | Lehmann | 72/241 |
| 4,212,504 | 7/1980 | Krylou et al. | 72/241 |
| 4,218,905 | 8/1980 | Lehmann et al. | 72/241 |
| 4,429,446 | 2/1984 | Lehmann | 72/241 |

FOREIGN PATENT DOCUMENTS 2547490 4/1977 Fed. Rep. of Germany ........ 72/241

Primary Examiner—Lowell A. Larson
Assistant Examiner—Jorji M. Griffin
Attorney, Agent, or Firm—Werner W. Kleeman

[57] ABSTRACT

In a hydrostatic support member a piston which is axially movable in a pressurized fluid medium-supplied cylinder carries at the end thereof which is remote from the cylinder at least two bearing shoes which are axially movable independently of each other and which can be inclined relative to each other. There is achieved an automatic adaptation of the bearing or running surface of the support member to a counter surface changing in distance, shape and curvature even throughout a wide tolerance range. Such a support member is particularly suited for supporting the working rolls in a rolling mill, the diameter of which decreases during the operating or service life thereof, or for the support of back-up or supporting rolls backing-up the working rolls.

18 Claims, 5 Drawing Figures

HYDROSTATIC SUPPORT MEMBER, PARTICULARLY FOR ROLLING MILLS, AND METHOD OF USING THE SAME

BACKGROUND OF THE INVENTION

The present invention relates to a new and improved hydrostatic support member or element, particularly, although not exclusively, for use in rolling mills, and to a new and improved method of using the aforementioned hydrostatic support member.

In its more specific aspects the invention relates to a new and improved hydrostatic support member or element, particularly for use in rolling mills, which comprises a pressure chamber or space adapted to be supplied with a pressure fluid or pressurized fluid medium and at least one movable bearing shoe containing a bearing or running surface provided with at least one pressure pocket flow communicating with the pressure chamber by means of at least one throttle or throttling bore.

Such hydrostatic support elements are known, for example, from U.S. Pat. No. 3,802,044, granted Apr. 9, 1974, and U.S. Pat. No. 3,846,883, granted Nov. 12, 1974, and serve to mount or support movable, especially rotating members relative to a base member or foundation. Due to an axial mobility of the piston and an inclinability of the bearing shoes there can be attained an automatic adaptation of the bearing or running surface to movements of the counter surface and the formation of a constant gap between the two members, and thus, there can be obtained a constant supporting force between the two members within certain limits.

Typical methods of using such hydrostatic support members in rolling mills are described in, for example, U.S. Pat. No. 4,041,752, granted Aug. 16, 1977, U.S. Pat. No. 4,059,976, granted Nov. 29, 1977, and U.S. Pat. No. 4,218,905, granted Aug. 26, 1980. Thus, a web of a material, like, for example, a metal band, a plastic foil or a paper web, is passed between two working rolls pressed against each other and is rolled or smoothed. The working rolls are suppoed by support members of the aforementioned type in a pressing plane or laterally or transversely thereof. Additionally, back-up or supporting rolls can be provided which press against the working rolls and which also may be supported by hydrostatic support members.

Instead of achieving a supporting action by using support members acting from the outside, the supporting action also may be provided at a carrier or support provided within the roll by the use of support members which are also arranged within the roll as described, for example, in U.S. Pat. No. 3,949,455, granted Apr. 13, 1976.

Due to abrasion and wear as well as due to the periodically required regrinding of the working rolls and, to a lesser extent, also the back-up or supporting rolls, the roll diameter continuously decreases during the period of operation of the rolling mill. In metal rolling mills, for example, the decrease in diameter may amount to as much as 10% until an exchange and a renewal of the working rolls is required. At a diameter of 25 cm. of the working rolls the bearing shoes of the support members thus would not only have to be able to adapt to a change in the distance of the bearing surface from the roll surface of more than 1 cm. but also the bearing surface would have to retain a uniform distance from the roll surface throughout the entire region when the radius of curvature of the roll surface changes by 10%. The aforementioned support members were not able to effect such adaption and permitted only substantially smaller changes in the diameter until the center of the bearing or running surface would engage the roll surface due to the different curvature. During operation of a rolling mill the bearing shoes thus had to be frequently exchanged for others having a different radius of curvature or had to be adapted to the changed roll diameter.

Due to the deformation of the rolls during operation of the rolling mill the radius of curvature of the roll surface also changes, particularly when supported from the inside when the roll is structured as a roll shell. Also in this case support members or elements are desirable which permit some degree of variation in the radius of curvature.

Hydrostatic support members or elements already have been suggested, as, for example, by British Patent Application Publication No. 2,073,829, published Oct 21, 1981 and U.S. Pat. No. 4,262,400, granted Apr. 21 1981, the bearing surface of which is elastically deformable or is made of a flexible material. However, the deformation range of such support members is too small to be used in rolling mills. With greater deformation there result too large counter forces which do not permit a uniform bearing or support gap. The elastically deformable or flexible material is unsuited for the rough rolling mill operation, has too small a service life and causes frequent shut-downs due to operational disturbances.

SUMMARY OF THE INVENTION

Therefore, with the foregoing in mind it is a primary object of the present invention to provide a new and improved hydrostatic support member which is not afflicted with the aforementioned drawbacks and limitations heretofore discussed.

Another and more specific object of the present invention is directed to the provision of a new and improved hydrostatic support member, particularly for rolling mills, which has an expanded range of use in respect of the distance and the radius of curvature of the counter surface relative to the bearing shoe.

Another significant object of the present invention is directed to a new and improved construction of hydrostatic support member, particularly for rolling mills which enables maintaining a substantially uniform supporting or bearing gap over the entire bearing surface Still another important object of the present invention is directed to the provision of a new and improved hydrostatic support member, particularly for rolling mills, which has a prolonged service life.

Now in order to implement these and still further objects of the invention which will become more readily apparent as the description proceeds, the hydrostatic support member of the present development is manifested by the features that, there are provided at least two bearing shoes which are movable relative to each other.

Advantageously, the bearing shoes which are arranged at a common piston can be displaced in axial direction independently of each other. It is also of advantage if the bearing shoes are designed so that they can be inclined or tilted relative to an axis, typically the lengthwise axis thereof, whereby the range of adaptation to the shape and position of the counter surface is considerably enlarged. There is especially rendered possible the use of such hydrostatic support members in rolling mills experiencing large changes in the diameter of the rolls. To avoid undesirably large deflections from occurring adjacent bearing shoes may be articulated or flexibly interconnected.

According to a further development of the hydrostatic support member according to the invention, it can be advantageous to provide in a cylinder a piston which is movable in axial direction of the cylinder, the piston being structured to permit throughflow of the pressurized fluid medium and carries the bearing shoes at its end which is remote or facing away from the cylinder.

BRIEF DESCRIPTION OF THE DRAWINGS

The invention will be better understood and objects other than those set forth above, will become apparent when consideration is given to the following detailed description thereof. Such description makes reference to the annexed drawings wherein.

DETAILED DESCRIPTION OF THE PREFERRED EMBODIMENTS

Figure 1:
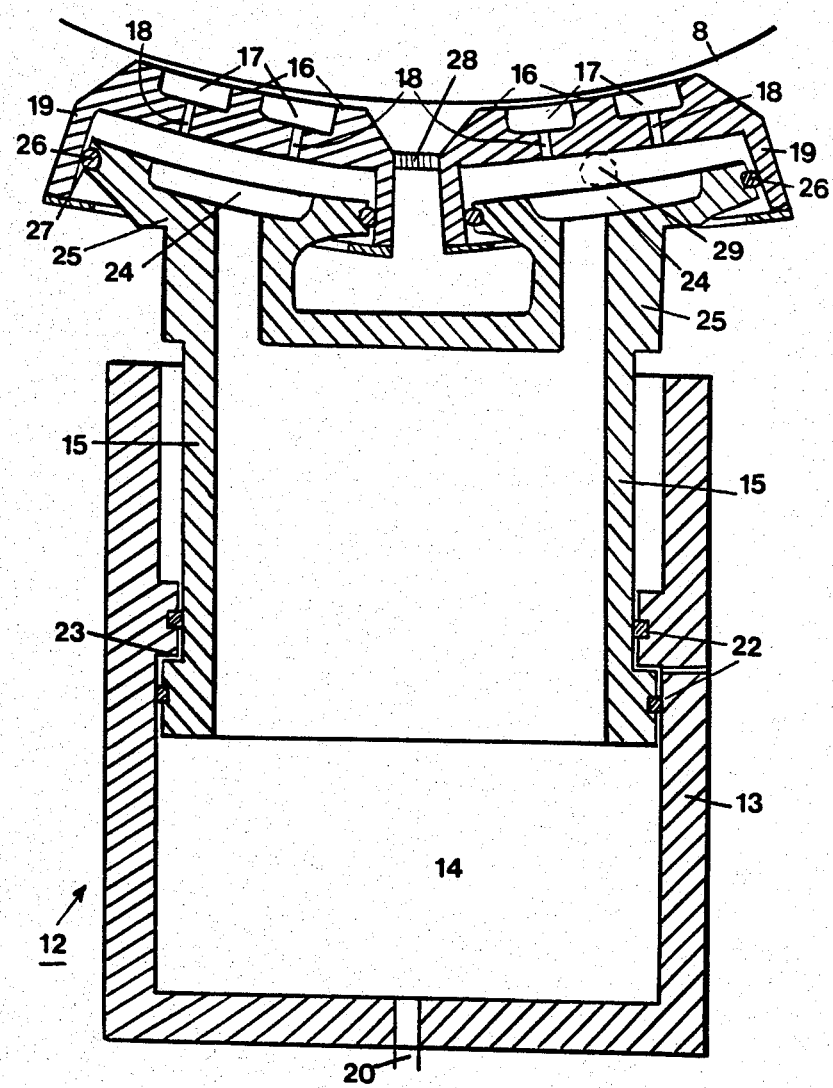
FIG. 1 is a longitudinal sectional view of a hydrostatic support member constructed according to the present invention.

Describing now the drawings, it is to be understood that only enough of the construction of the hydrostatic support members and related rolling mill structure has been shown as needed for those skilled in the art to readily understand the underlying principles and concepts of the present development, while simplifying the showing of the drawings. Turning attention now specifically to FIG. 1, there has been illustrated therein in cross-section an exemplary embodiment of a hydrostatic support member or element 12 comprising a cylinder 13 having a circular, elliptical, rectangular or any other suitable cross-sectional configuration. A piston 15 is arranged for axial movement in the cylinder 13. The piston 15 is sealed by sealing rings 22 and the axial movement thereof is limited by a stop ring or stop means 23. Between the two members 13 and 15 there is formed a pressure chamber or space 14 into which there is supplied a pressure fluid or pressurized fluid medium like, for example, water, oil or lubricating fluid by means of an infeed line or conduit 20. The piston or piston member 15 is of hollow construction and thus internally thereof permits the throughflow or passage of the pressurized fluid medium. This piston 15 also carries at the end thereof which is remote from the cylinder 13 two head members 25, each of which is provided with a respective pressure chamber or space 24, which thus flow communicate with the pressure space or chamber 14 and hence are supplied with pressurized fluid medium therefrom. Each of the head members or projections 25 carries a bearing shoe 19, the bearing or running surface 16 of which is provided with pressure pockets 17 communicating with the pressure chambers 24 through throttle or throttling bores 18. The bearing shoes 19 are sealed by sealing rings 26 and are axially movable relative to each other to a certain extent. Due to a rounded or curved design of the outer margins or edges 27 of the head members 25 the bearing shoes 19 can be inclined or tilted relative to the head members 25, and thus, also relative to and independent of each other with respect to the lengthwise axis of the cylinder 13.

As in the known hydrostatic support members here too a pressurized fluid medium is supplied, during operation, through the line 20 into the pressure chamber or space 14, and thus, to the pressure chambers or spaces 24. The bearing shoes 19 are thus pressed against the counter surface 8. Since, however, the pressurized fluid medium flows through the throttling bores 18 into the pressure pockets 17, the bearing shoes 19 will lift-off from the counter surface 8 due to the build-up of a counter pressure and there is formed a gap. Hence, a contactless support is formed between the bearing surface 16 and the counter surface 8. To a certain extent the bearing shoes 19 follow the movements of the counter surface 8, so that this gap remains constant independent of the distance and inclination of the counter surface 8.

Due to the specific design and shape of the hydrostatic support member 12 as described hereinbefore the capability thereof to adapt to a change in the shape and in the position of the counter surface 8 is considerably improved. Since the bearing shoes 19 can be inclined independently of each other these bearing shoes 19 automatically adapt to a canted or inclined counter surface 8. Adaptation to a changed curvature of the counter surface 8 is achieved to a substantially larger extent than was heretofore possible by subdividing the width of the hydrostatic support member into a number of smaller bearing surfaces 16 which are movable independently of each other and which collectively form approximately the same bearing surface, while each of them permits a larger tolerance of the curvature of the counter surface 8.

To prevent any uncontrolled tilting and canting of the bearing shoes 19, it is possible to interconnect adjacent bearing shoes 19, according to an advantageous further development of the hydrostatic support member according to the invention, by an articulated, elastic or flexible intermediate member 28. The bearing shoes 19 also may be supported at the head member 25 of the piston 15 by means of a ball or spherical joint 29.

Instead of just two bearing shoes 19 as illustrated in FIG. 1, the hydrostatic support members also may carry a greater number of bearing shoes like, for example, three or five which are arranged behind one another in the circumferential direction of the counter surface 8, whereby there is beneficially achieved a further improvement in the tolerance range. In such case, the central bearing shoe also may be fixedly mounted to the piston and only the outer bearing shoes may be movable.

In cases where there do not occur any great changes in the distance between the hydrostatic support member 12 and the counter surface 8, the piston 15 may be fixedly connected to the cylinder wall or may be entirely omitted. Also an articulated or tiltable connection between the piston 15 and the cylinder 13 can be of advantage.

Figure 2:
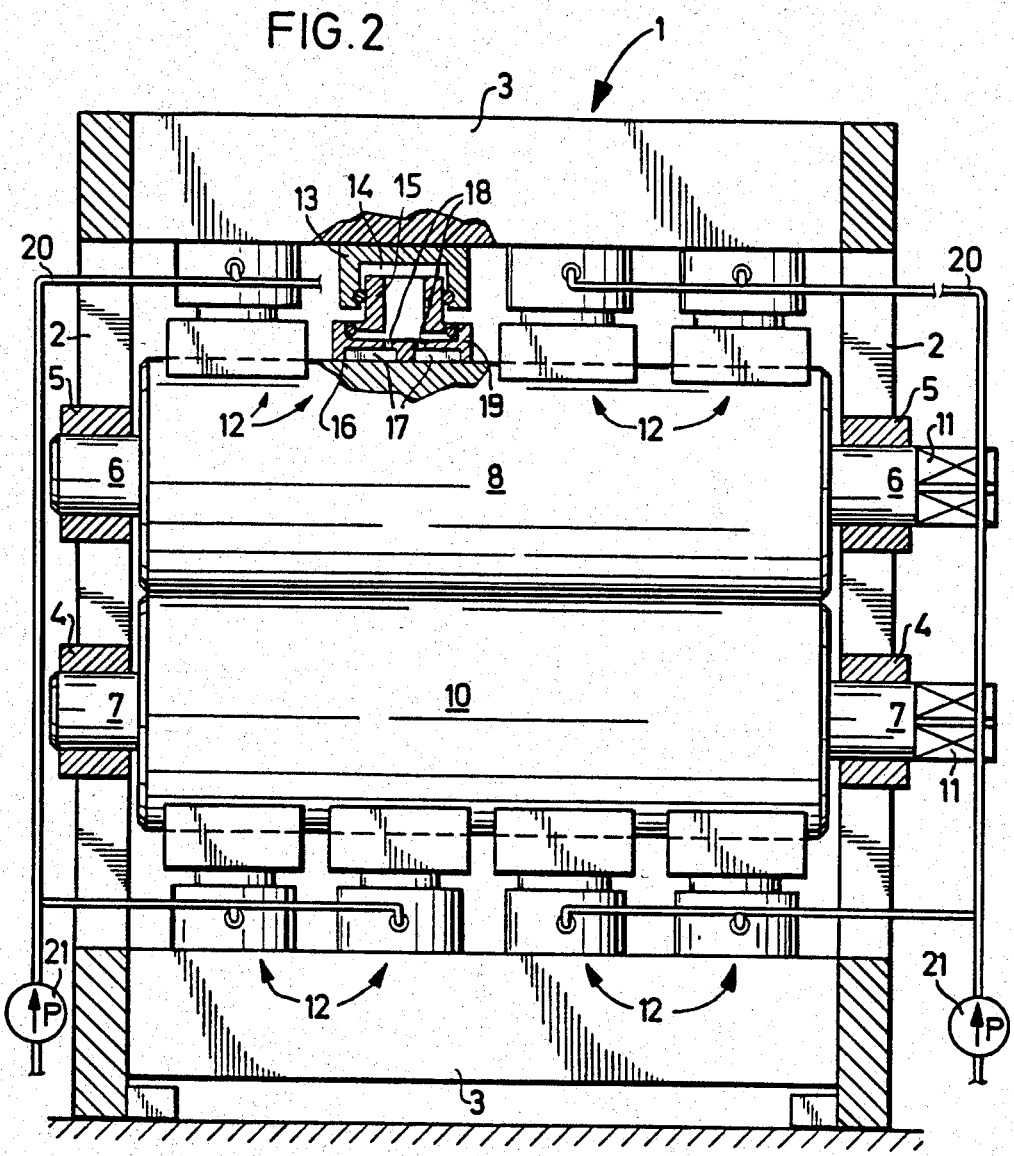
FIG. 2 is a side view of a duo or double-roller rolling mill incorporating the hydrostatic support members of the type shown in FIG. 1.
Figure 3:
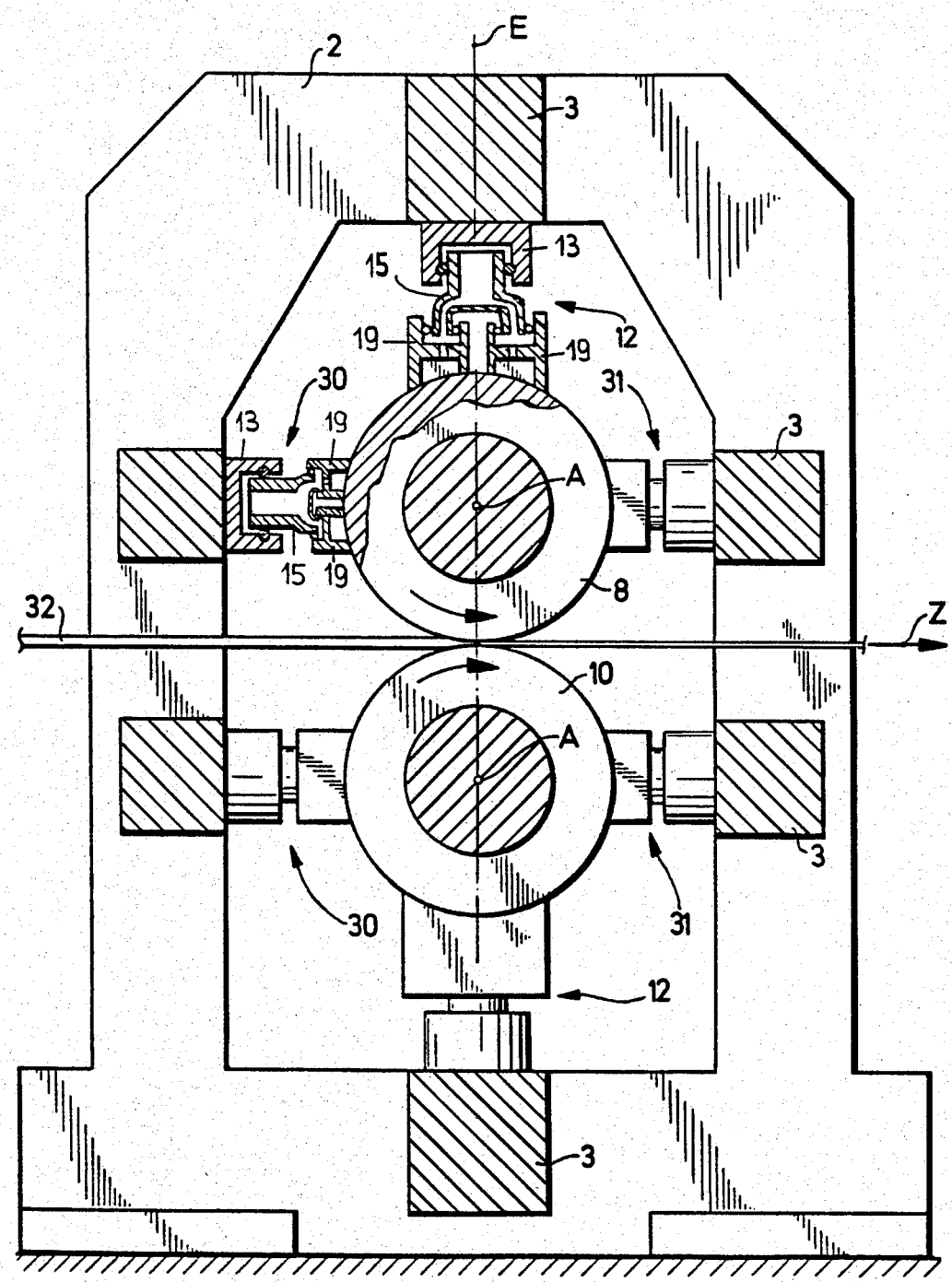
FIG. 3 is a cross-sectional view of the rolling mill shown in FIG. 2.

FIGS. 2 and 3 show a so-called duo or double-roller rolling mill in which there are used the hydrostatic support members 12 shown in FIG. 1. The rolling mill comprises a roll stand or frame 1 containing two lateral stands or uprights 2 and traverses or crossties 3 located therebetween. Bearing supports 4 and 5 are arranged in the stands 2, the bearing supports 4 being secured to the stands 2 and the bearing supports 5 being movably guided. Roll journals or pins 6 and 7 of two working or work rolls 8 and 10 respectively, are rotatably journaled in the bearing supports 5 and 4, respectively. The working rolls 8 and 10 are driven via square or multi-cornered ends 11 of the roll journals or pins 6 and 7, respectively.

To press the working rolls 8 and 10 against or towards each other in the pressing plane E (FIG. 3) there are provided hydrostatic support members 12 constructed in the manner described with reference to FIG. 1, these hydrostatic support members 12 being arranged at both sides of the working rolls 8 and 10, as shown in FIGS. 2 and 3. The hydrostatic support members 12 are supported at the traverses 3 and exert a pressing force upon the roller surface and the material 32 to be rolled when a hydraulic pressurized fluid medium is supplied to the pressurized fluid medium lines 20 from any suitable pressurized fluid medium source 21 like, for example, the depicted pumps.

Instead of this arrangement, or in addition thereto, and as shown in FIG. 3, the hydrostatic support members according to the invention, however, also can be arranged as hydrostatic support members 30 and 31 which laterally support the working rolls 8 and 10. Such a lateral support arrangement is especially advantageous for rolling metallic bands or webs 32 during which considerable forces Z will result in the rolling direction. Instead of the support direction of the support members extending exactly perpendicular to the pressing plane E the support direction of the hydrostatic support members 30, 31 also may be selected so as to be directed at an angle or transversely relative thereto, depending upon the requirements of the forces or their resultants effective in the rolling mill. The pressing force can be generated in conventional manner or also by means of supporting sources, for example also in the form of hydrostatic support members.

Figure 4:
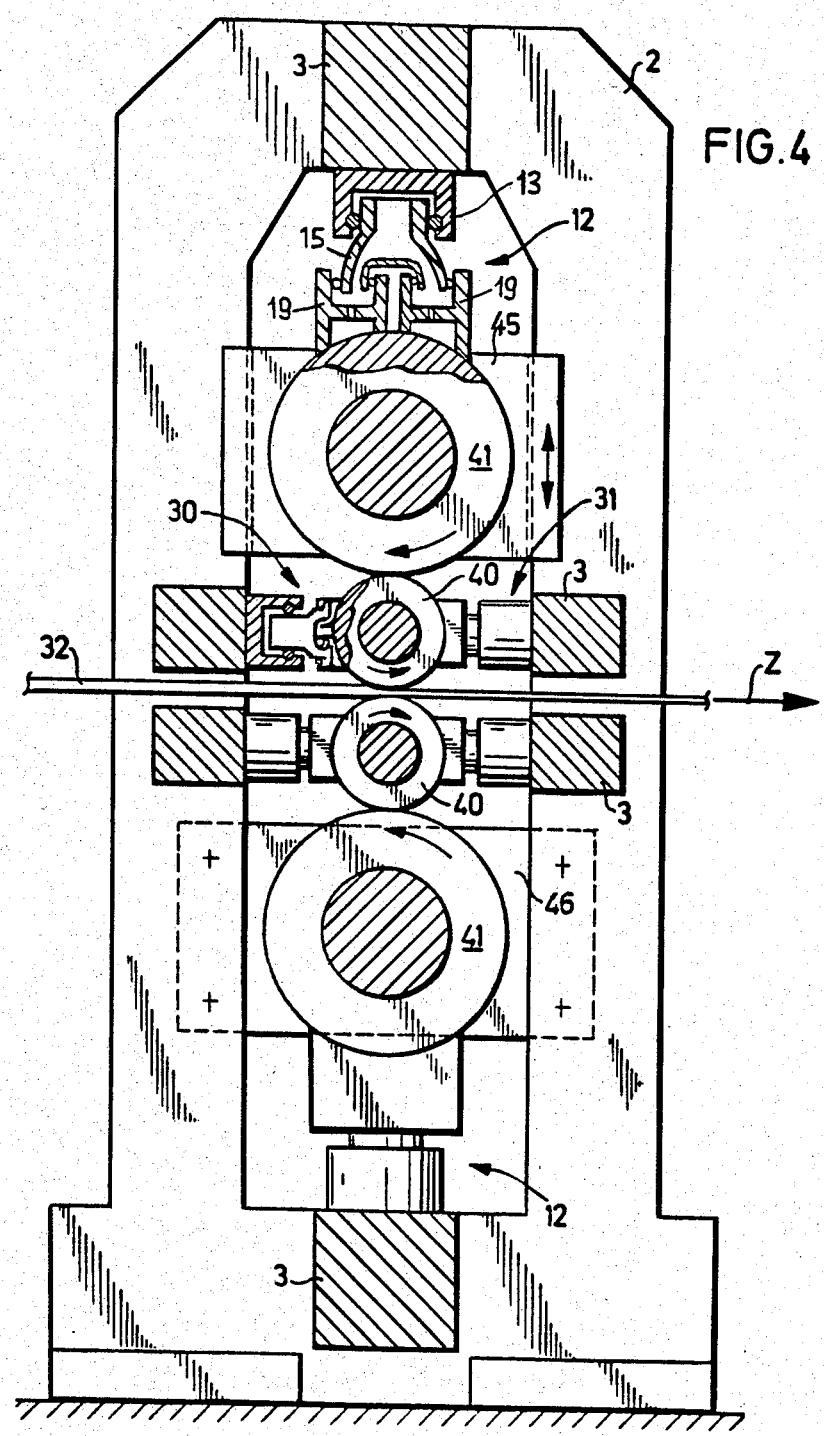
FIG. 4 is a cross-sectional view of a quarto or four-high roller rolling mill incorporating hydrostatic support members of the type shown in FIG. 1.

The quarto or four-high roller arrangement of a rolling mill as shown in FIG. 4 comprises working rolls 40 which are supported at particular back-up or supporting rolls 41. The lower back-up or supporting roll 41 can be rotatably journaled in a stationary bearing support 46 and the remaining rolls can be guided in vertical direction in appropriate bearing supports of which only the top or uppermost bearing support 45 is shown. Such a quarto or four-high roller rolling mill has the advantage that, for a required pressing force, the working or work rolls 40 may have a particularly small diameter. The necessary rolling force and the driving torque of the rolling mill are thus reduced.

Also in this embodiment there are advantageously used hydrostatic support members constructed according to the invention which serve as lateral support elements 30 and 31 for the working rolls 40, in order to be able to take-up in a trouble-free manner changes in the diameter and in the position of the working rolls 40 while maintaining a uniform and faultless bearing or supporting gap. The support or supporting elements 12 acting upon the back-up or supporting rolls 41 in the pressing plane also may be designed in accordance with the invention, or else conventionally, or also may be designed as hydrostatic support members acting upon the inside of the back-up or supporting rolls as described in, for example, the aforementioned U.S. Pat No. 4,059,976. Even more than one back-up or supporting roll can be operatively associated with each working roll 40. The back-up or supporting rolls 41 as such again may be supported at further back-up or supporting rolls in which, if desired, the hydrostatic support members according to the invention also can be again used.

Figure 5:
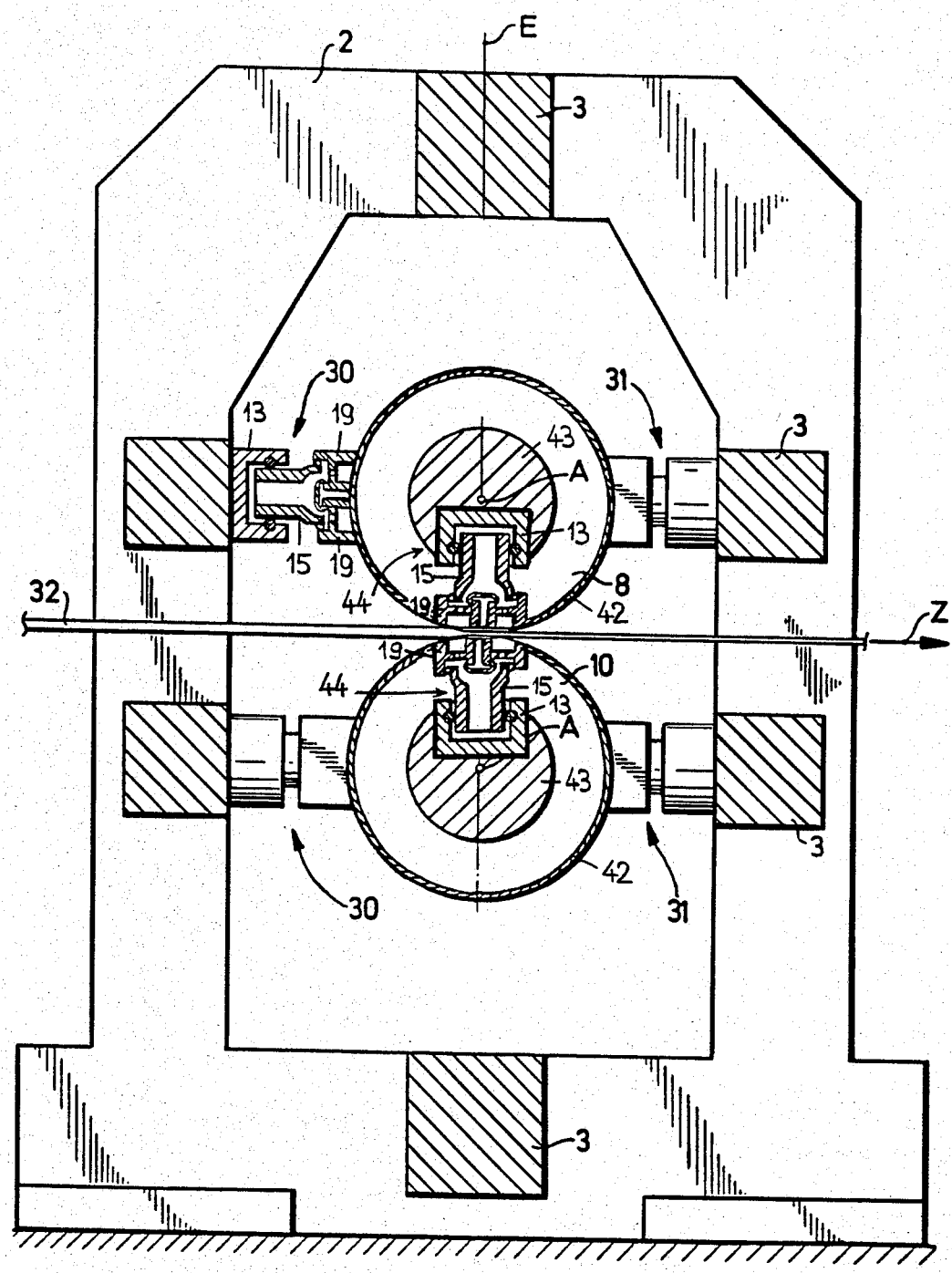
FIG. 5 is a cross-sectional view of a duo or double-roller rolling mill incorporating hydrostatic support members of the type shown in FIG. 1 in an inside arrangement providing an internal support.

In the embodiment as shown in FIG. 5 the working rolls 8 and 10 are not constructed in the form of solid rolls supported at their outer side or externally as shown in FIG. 3, but as hollow rolls comprising a fixed carrier or beam 43 and a roll shell 42 journaled for rotation about this fixed carrier or beam 43 defining a stationary roll shell support.

Hydrostatic support members 44 constructed according to the invention or brace support the inside of the roll shell 42 at the fixed carrier or beam 43. The other components correspond to the parts shown in FIG. 3 and are thus conveniently designated by the same reference characters. By means of this arrangement larger deformations of the rolls are permitted than when using heretofore known constructions of support elements. If desired, it also may suffice to design only one of the two working rolls 8 or 10 in the manner as described hereinbefore.

The use of the inventive hydrostatic support members also is not limited to rolling mills but can be used with particular advantage in all instances where relatively movable members have to be faultlessly mounted and supported with large tolerances as concerns distance, position and curvature.

While there are shown and described present preferred embodiments of the invention, it is to be distinctly understood that the invention is not limited thereto, but may be otherwise variously embodied and practiced within the scope of the following claims. ACCORDINGLY,

What we claim is:

1. A hydrostatic support member, comprising:
   means defining a pressure chamber capable of being supplied with a pressurized fluid medium;
   at least two bearing shoes supported by said pressure chamber and being displaceable relative to each other;
   each said bearing shoe comprising a bearing surface provided with at least one pressure pocket; and
   at least one respective throttling bore for connecting each said pressure pocket with said pressure chamber.

2. The hydrostatic support member as defined in claim 1, further including:
   means for mounting at least one of said at least two bearing shoes so as to be movable in a predetermined support direction.

3. The hydrostatic support member as defined in claim 1, further including:
   means for mounting each of said at least two bearing shoes so as to be movable independently of each other in a predetermined support direction.

4. The hydrostatic support member as defined in claim 1, further including:
   means for mounting at least one of said at least two bearing shoes so that it can be inclined relative to another one of said at least two bearing shoes.

5. The hydrostatic support member as defined in claim 4, wherein:
said mounting means comprise hinge means for hingedly interconnecting at least two adjacent bearing shoes.

6. The hydrostatic support member as defined in claim 4, wherein:
said mounting means comprise elastic means for elastically interconnecting at least two adjacent bearing shoes.

7. The hydrostatic support member as defined in claim 4, wherein:
said mounting means comprise flexible means for flexibly interconnecting at least two adjacent bearing shoes.

8. The hydrostatic support member as defined in claim 1, further including:
means for mounting each of said at least two bearing shoes so as to be inclinable independently of and relative to each other.

9. A hydrostatic support member comprising:
means defining a pressure chamber capable of being supplied with a pressurized fluid medium;
at least two bearing shoes displaceable relative to each other;
each said bearing shoe comprising a bearing surface provided with at least one pressure pocket;
at least one respective throttling bore for connecting each said pressure pocket with said pressure chamber;
said means defining a pressure chamber comprises a cylinder defining a cylinder axis;
a piston carrying said at least two bearing shoes at an end thereof remote from said cylinder; and
said piston being arranged to be movable in said cylinder in the direction of said cylinder axis and being structured to permit throughflow of said pressurized fluid medium.

10. The hydrostatic support member as defined in claim 9, further including:
stop means for limiting axial movement of said piston in said cylinder.

11. A method of using a hydrostatic support member comprising a pressure chamber adapted to be supplied with pressurized fluid medium, at least two bearing shoes displaceable relative to each other, each bearing shoe comprising a bearing surface provided with at least one pressure pocket, and at least one respective throttling bore connecting each said pressure pocket to said pressure chamber, said method comprising the steps of:
acting upon a material to be rolled in a pressing plane by means of a rolling mill containing two working rolls; and
supporting at least one of the working rolls with said hydrostatic support member containing said at least two relatively displaceable bearing shoes.

12. The method as defined in claim 11, further including the step of:
supporting said working rolls in said pressing plane by said hydrostatic support member.

13. The method as defined in claim 11, further including the step of:
supporting said working rolls transversely with respect to said pressing plane by said hydrostatic support member.

14. The method as defined in claim 11, further including the step of:
supporting said working rolls at an angle relative to said pressing plane by said hydrostatic support member.

15. The method as defined in claim 11, further including the steps of:
supporting at least one of said working rolls at a back-up roll; and
supporting said back-up roll by means of said hydrostatic support member.

16. The method as defined in claim 11, further including the steps of:
arranging said hydrostatic support member in the interior of a rotatable roll shell having an inner side; and
supporting said inner side of said roll shell at a stationary carrier by means of said hydrostatic support member.

17. A hydrostatic support member, comprising:
means defining a pressure chamber capable of being supplied with a pressurized fluid medium;
a common support member for at least two relatively movable bearing shoes;
at least two relatively movable bearing shoes supported by said common support member and being displaceable relative to each other upon said common support member;
each said bearing shoe comprising a bearing surface provided with at least one pressure pocket; and
at least one respective throttling bore for connecting each said pressure pocket of said at least two relatively movable bearing shoes with said pressure chamber.

18. A hydrostatic support member connectable to a source of hydrostatic pressure and hydrostatically supporting a roll which is supported by a predetermined number of such hydrostatic support members, each of said hydrostatic support member comprising:
a common support member for at least two relatively movable bearing shoes;
at least two relatively movable bearing shoes operatively connected to said hydrostatic pressure source and being supported upon said common support member so as to be displaceable relative to each other;
each one of said at least two relatively movable bearing shoes comprising a bearing surface provided with at least one pressure pocket; and
at least one respective throttling bore connecting each said pressure pocket of said at least two relatively movable bearing shoes with said hydrostatic pressure source.

* * * * *